April 17, 1962  J. A. BROWN, JR  3,029,745
CARGO CART CONVEYING DEVICE
Filed Oct. 19, 1959  11 Sheets-Sheet 4

INVENTOR:
JOSEPH A. BROWN, JR.
BY Moore, White & Burd
ATTORNEYS

April 17, 1962  J. A. BROWN, JR  3,029,745
CARGO CART CONVEYING DEVICE
Filed Oct. 19, 1959  11 Sheets-Sheet 6

INVENTOR:
JOSEPH A. BROWN, JR
BY Moore, White & Burd
ATTORNEYS.

April 17, 1962  J. A. BROWN, JR  3,029,745
CARGO CART CONVEYING DEVICE
Filed Oct. 19, 1959  11 Sheets-Sheet 7

INVENTOR:
JOSEPH A. BROWN, JR.
BY Moore, White & Burd
ATTORNEYS.

FIG. 21

United States Patent Office 3,029,745
Patented Apr. 17, 1962

3,029,745
CARGO CART CONVEYING DEVICE
Joseph A. Brown, Jr., Minneapolis, Minn.
(Box 296B, Rte. 2, Mound, Minn.)
Filed Oct. 19, 1959, Ser. No. 847,293
12 Claims. (Cl. 104—162)

This invention is a cargo loading device to assist in loading and unloading carriers such as semi-trailers, trucks and railroad cars at terminal installations, and shippers or receivers platforms. It comprises an extendible track means which supports an endless means to which lugs are secured that engage other pins or lugs secured to cargo carrying carts. The pins on the carts are spaced farther apart than the opposite sides of the extendible means so that pins engage only one set of lugs at a time. Thus, carts can be conveyed in either direction by said endless movable means at the will of the operator by engaging the cart with lugs moving in the desired direction. The device is extendible and collapsible to adapt it to various cargo carrying instrumentalities such as trucks, trailers, or railroad cars, loading platforms, unloading platforms, warehouses and/or storage operations whether relatively full or empty. In its collapsed condition the device can be parked in any convenient location in the loading area of the terminal without occupying much space. Cooperating means are interconnected with the extending means in order to take up excess endless element when the device is collapsed as compared to when it is extended so that the endless element is never allowed to become loose.

When loading many forms of cargo in carriers such as trucks, semitrailers, and railroad cars, wheel carts are used to carry cargo to be loaded or unloaded into and out of the carriers. When such carts are used for loading, considerable human time and energy is expended just wheeling the carts back and forth. Furthermore, the energy thus expended is not available for speeding the work of loading and unloading the carts themselves.

Even when fork lifts and like aids can be used, time is consumed in simply transporting the device back and forth which is accomplishing nothing by way of loading or unloading. While less human energy is involved, therefore, the time element continues to be a problem.

Accordingly, it is the principal object of this invention to provide a novel cargo cart conveying device.

It is also an object of this invention to provide a powdered telescopic conveyor that will convey carts loaded with cargo in one direction for unloading and return the empty carts in the opposite direction.

It is a still further object of this invention to provide a cargo cart conveyor that improves service to the shipping public and reduces the costs of operation by reducing time consumed in the loading and/or unloading and movement operations of wheeled carts.

It is a further object of this invention to provide such a cargo cart conveying device that employs a novel endless element arrangement to convey carts along a track means.

It is a still further object of this invention to have such endless means secured to an extendible, collapsible track means with take-up structure for preventing slack in the endless means regardless of the length of the track means.

Yet another object of this invention is to provide such a cargo cart conveying device that will convey carts along its length in either direction at the will of the operator with a single direction of movement of the endless means thereof.

It is a further object of this invention to make such a cargo cart conveyor that is portable.

Still further objects of this invention are inherent in the specific structures and combinations thereof shown and described hereafter.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which.

Figure 1:
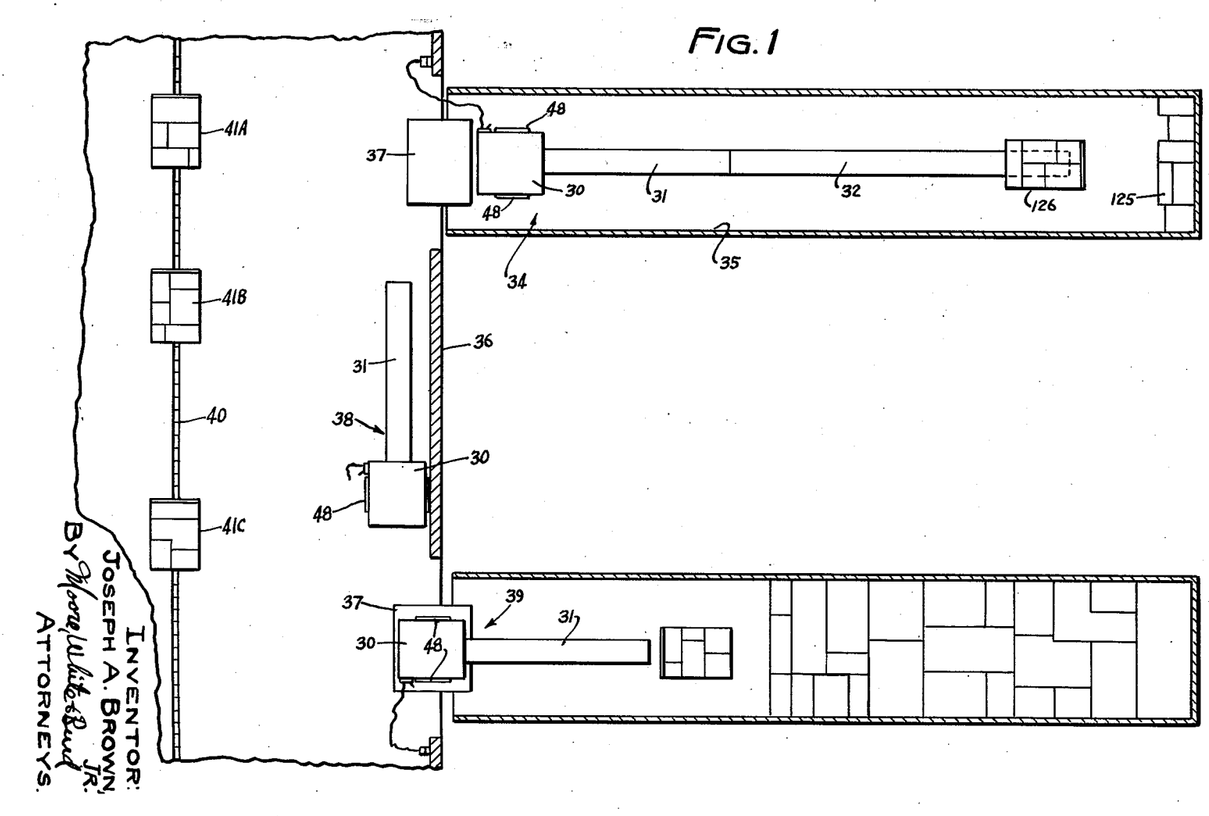
FIGURE 1 is a diagrammatic view of a portion of a warehouse terminal in plan together with two cargo carriers being moved by means of the cargo cart conveyor.

In FIGURE 1 the invention may be seen in a general way as comprising a plurality of conveyor units 30 each having rigidly secured thereto a main conveyor section 31 from which an extensible conveyor section 32 may be either extended or into which it may be contracted. As shown in FIGURE 1, the unit may be used either to convey cargo carrying carts to its fully extended length and in some instances as shown at 34 with the conveyor unit entirely inside a truck body 35 which is interconnected with the dock 36 by means of the usual dock plate 37. Such a positioning of a conveyor may be necessary when loading the front end of a very long semitrailer body or the like. At 38 is seen one of the conveyor units not in use and parked in its contracted position. At 39 may be seen one of the conveyor units being employed with a partially emptied van body with the conveyor being used in a retracted condition. It will also be noted that the conveyor has been withdrawn onto the dock plate.

Figure 13:
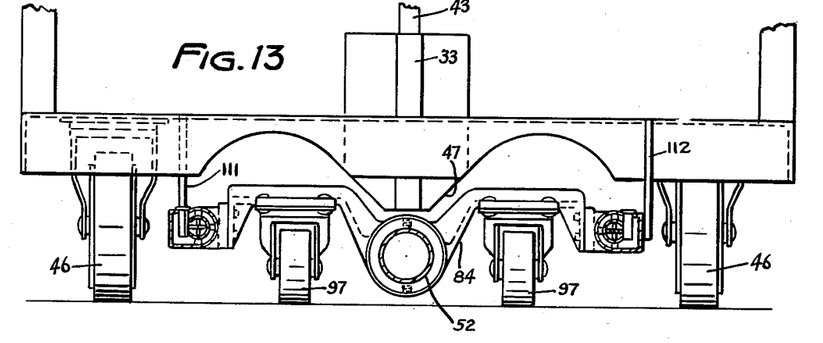
FIGURE 13 is a sectional view taken on the line 13—13 of FIGURE 5 and with a cargo truck indicated thereon having one of its pins engaged by a chain lug; hidden elements are shown in broken lines; the scale is between those of FIGURES 2 and 10.
Figure 14:
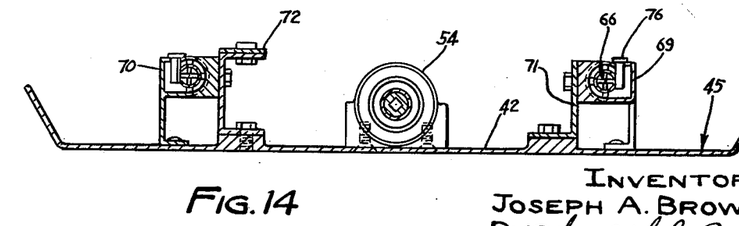
FIGURE 14 is a fragmentary sectional view taken on the line 14—14 of FIGURE 5 and drawn to the same scale as FIGURE 13; hidden elements are shown in broken lines.

A conventional drag line conveyor is represented at 40 bringing the loaded carts 41A, 41B, and 41C from a cart loading area (not shown) or carrying loaded carts to an unloading area (not shown) or otherwise conveying cargo in the terminal platform. Carts 41A, 41B and 41C are provided with pins that can be lowered to connect them to conveyor 40 or raised to release them from the conveyor. This structure is shown in connection with the enlarged views of the cart in FIGURES 13 and 15. A socket 33 secured to cart 47 receives slidably a pin 43 which may be lowered to engage conveyor 40 or raised to disengage the cart from that conveyor.

Figure 9:
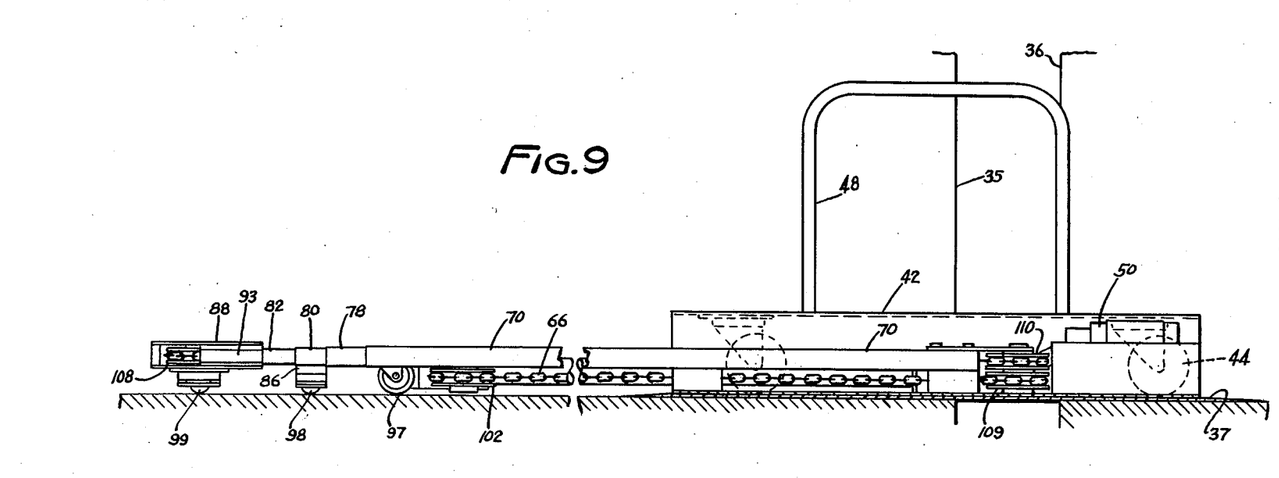
FIGURE 9 is a fragmentary partial side elevation, partial longitudinal section of the cargo cart conveyor taken on the line 9—9 of FIGURE 2 and drawn to the same scale.
Figure 10:
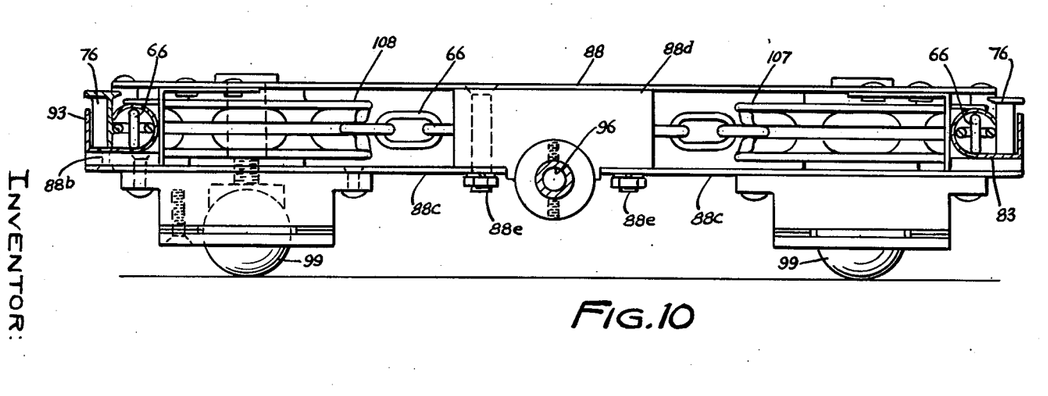
FIGURE 10 is a cross sectional view taken on the line 10—10 of FIGURE 6; the truck shown in FIGURE 6 is not included; hidden elements are shown with dotted lines; the scale used is between those of FIGURES 2 and 4.
Figure 11:
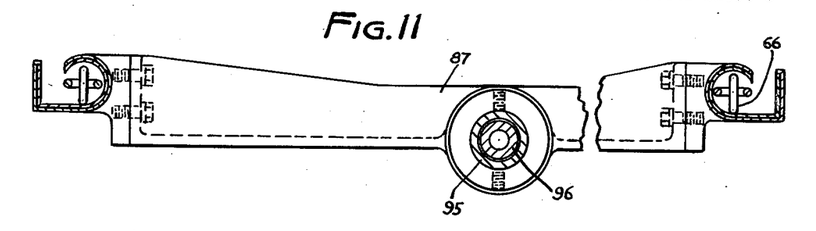
FIGURE 11 is a fragmentary sectional view taken on the line 11—11 of FIGURE 6; portions of the device are deleted to conserve space, hidden elements are designated in broken lines, and the scale used is the same as that of FIGURE 10.
Figure 12:
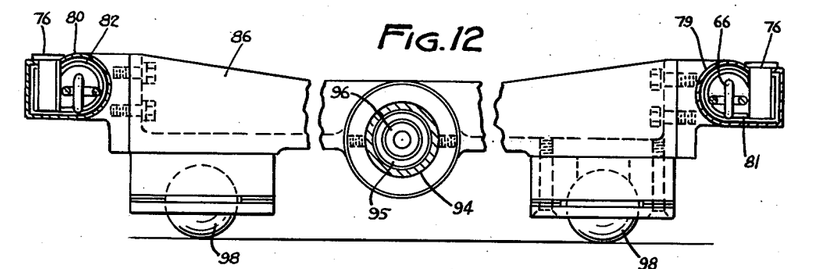
FIGURE 12 is a fragmentary sectional view taken on the line 12—12 of FIGURE 6 and drawn to the same scale as FIGURE 10; broken lines illustrate hidden parts.

FIGURES 2, 5 and 15, and 20 illustrate the power end of the apparatus in more detail wherein it will be seen to comprise a base plate 42. Wheels 44 are secured to its outside edges, and the plate is channeled down as at 45 to permit the wheels 46 of a cart 47 to pass over the base plate 42. Manipulating bars 48, see FIGURES 9 and 15, permit personnel to place the conveyor as desired. As seen in both FIGURES 2 and 15, the power unit has a motor support frame structure 49 to which are secured suitable power units or motors 50 and 51 for the two mechanisms of the device. Motor 50 through an appropriate gear reduction and flexible drive shaft 53 powers the main tube element 52 of the extending contracting means which is suitably supported on frame 49 by means of the bearing structure 54.

Figure 16:
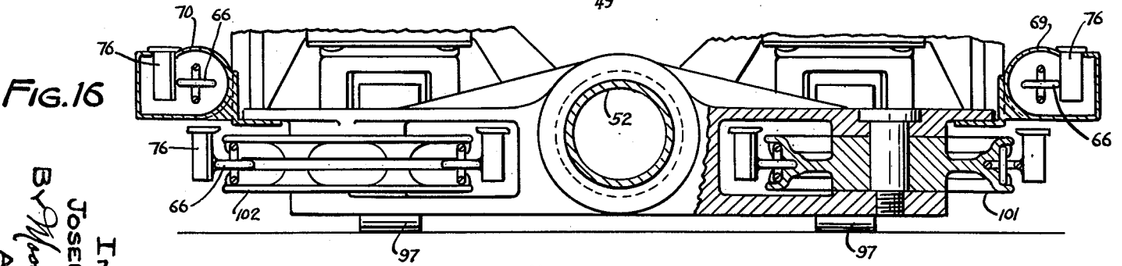
FIGURE 16 is a sectional view taken on the line 16—16 of FIGURE 2; broken lines illustrate hidden parts and a portion of the device is deleted to conserve space; the scale used is the same as that of FIGURE 10.
Figure 17:
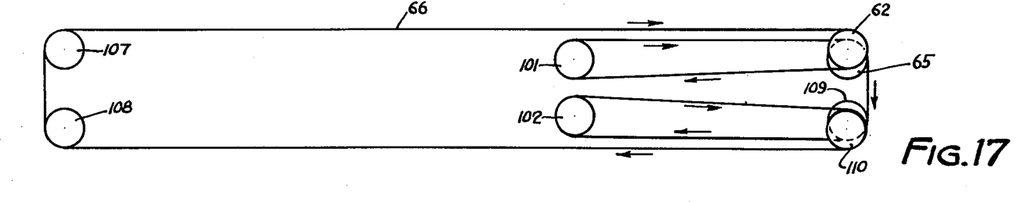
FIGURE 17 is a diagrammatic showing of the course of the endless element around the pulleys.
Figures 19, 20:
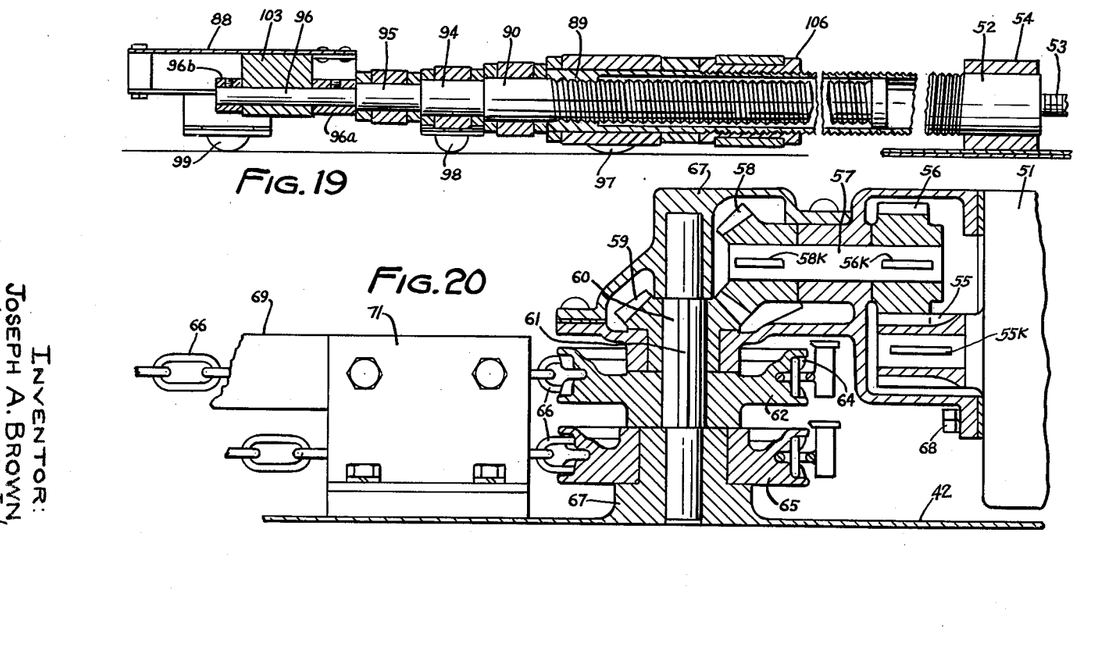
FIGURE 19 is a view similar to FIGURE 18 and drawn to the same scale only showing the extending drive elements in a collapsed rather than extended position.
FIGURE 20 is a vertical sectional view through the endless means drive structure showing its internal construction; it is drawn to the same scale as FIGURE 10.
Figure 21:
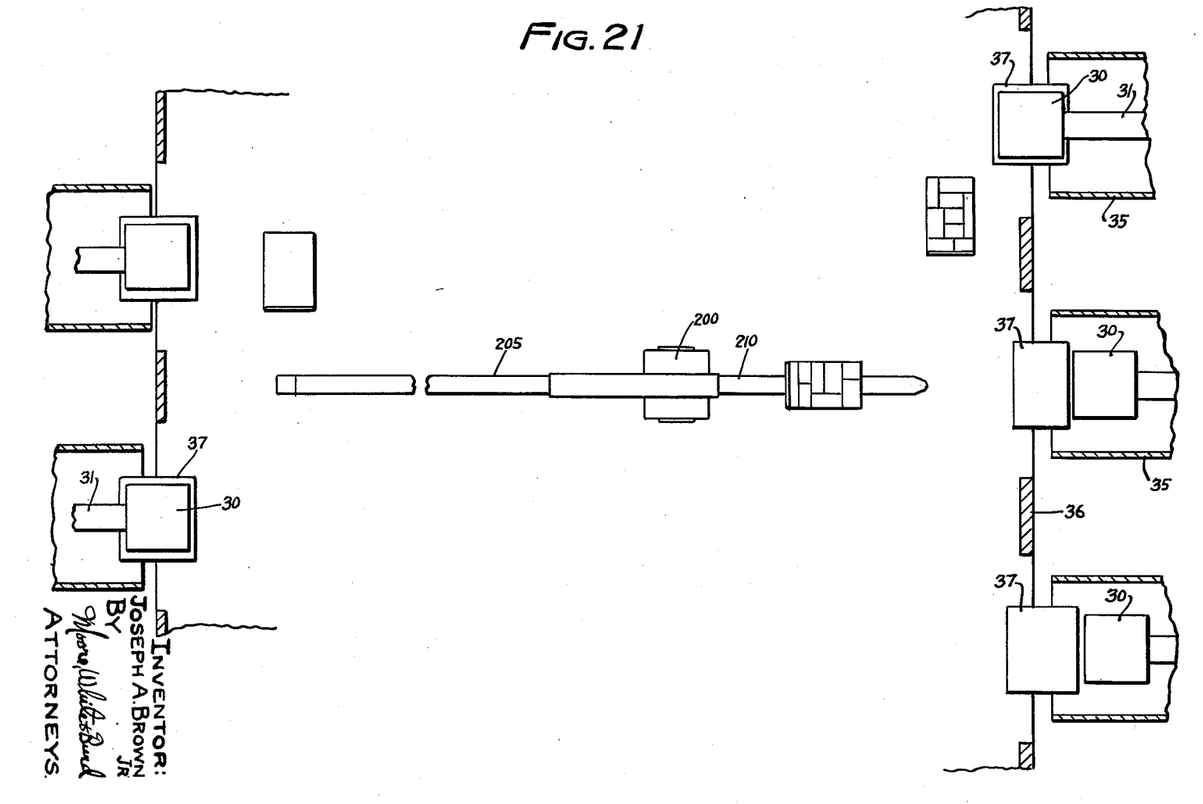
FIGURE 21 is a diagrammatic plan view of a fragment of a terminal loading area illustrating the use of the cargo cart conveying device both in loading and unloading vehicles backed up to the terminal or warehouse platform and also illustrating use of the cargo cart conveyor in transporting carts loaded with cargo across loading dock area from one side to the other.

Motor 51 drives an endless chain through a speed reduction system by rotating a sprocket-type sheave at one end of the endless chain. In FIGURE 20 a suitable gear reduction drive system is shown wherein pinion 55 drives spur gear 56 which is mounted on a joint shaft 57 with bevel gear 58. Gears 55, 56, and 58 are appropriately secured against rotation on their respective shafts by keys 55K, 56K, and 58K, respectively. Bevel gear 58 meshes with the gear of the sheave bevel gear 59. Sheave bevel gear 59 is secured to shaft 60 by means of a suitable key 61 which also keys the drive sheave 62 to the shaft 60. Thus, when motor 51 is operated, its drive shaft drives gear 55 and through the gear train supplies power to the sheave 62. Sheave 62 is a conventional sprocket-type sheave having lugs 64 formed thereon which engage portions of the chain to apply non-slipping power thereto. An idler sheave 65 rides on the lower end of shaft 60 but is not keyed thereto as is the sheave 62. A portion of the chain 66 can be seen in FIGURE 16. FIGURE 17 schematically illustrates chain 66 and the various sheaves with which it is engaged. An appropriate housing structure 67, shown in FIGURE 20, encloses all of the mechanism just described for supplying power to the chain. It is secured to the frame 49 and to motor 51 by appropriate means represented by the bolts 68 in FIGURE 15.

Figures 2, 4:
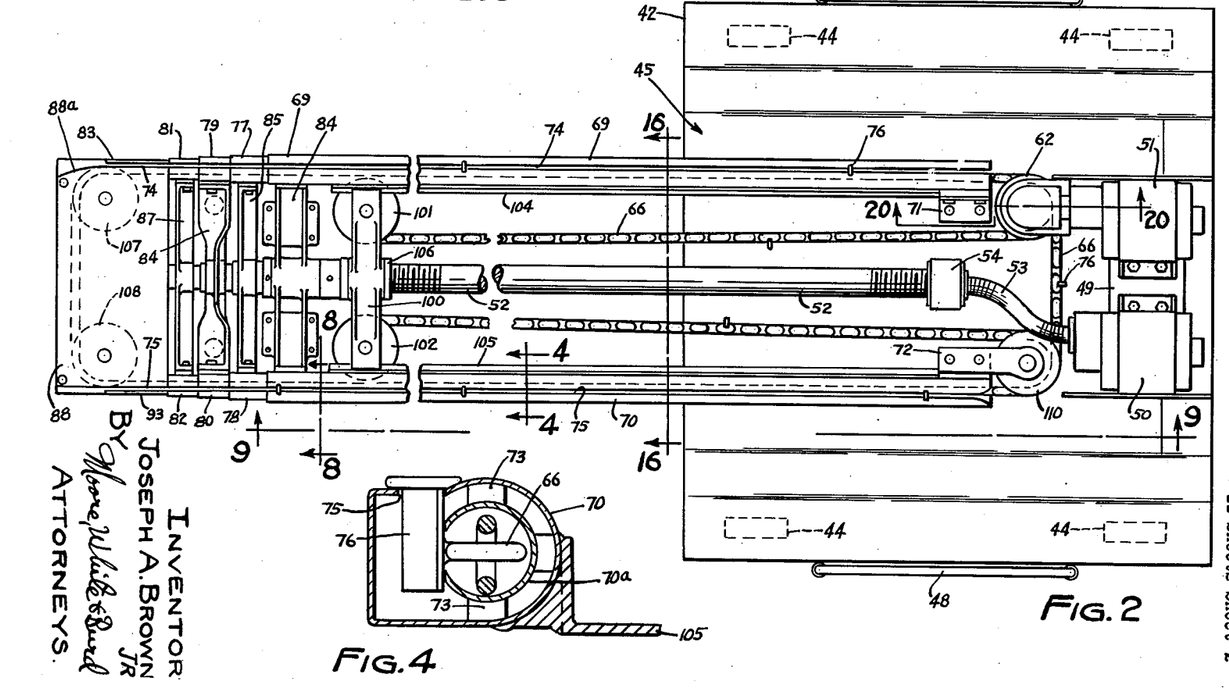
FIGURE 2 is a plan view of the unloader in the retracted position and with portions thereof broken away to conserve space; hidden elements are indicated in broken lines.
FIGURE 4 is an enlarged vertical section taken on the line 4—4 of FIGURE 2.
Figure 8:
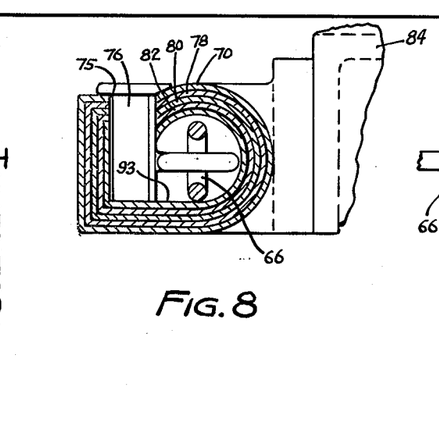
FIG. 8 is a vertical section taken on the line 8—8 of FIGURE 7 and FIGURE 2 and drawn to the same scale as FIGURE 7.

In FIGURE 2 the conveyor track elements are shown as comprising fixed track sections 69 and 70 which are rigidly secured to the base plate 42, as at 71 in the case of 69 and 72 in the case of 70. These track elements comprise partially tubular structures as seen in FIGURES 4 and 8 which surround and support the chain 66. They have open channels at their tops designated 74 and 75 for tracks 69 and 70, respectively. The purpose of the channels is to allow the lugs 76 which are welded to chain 66 to extend up and be supported in the top of the tracks so as to engage the pins provided for that purpose on the carts used with the cargo cart conveyor.

Telescopically arranged within track 69 are the extendible track elements 77, 79, 81, and 83 while similar track elements 78, 80, 82, and 93 telescope within the track element 70. Between the ends of tracks 69 and 70 is the brace and wheel support 84. Between tracks 77 and 78 is a plain brace 85 while a brace 86 having casters supports and connects the ends of the elements 79 and 80. A final brace element extends between the section 81, 82 and is designated 87. Secured to the outer ends of the final extension member is the plate 88 which connects the outer ends of track elements 83 and 93 that telescopically engage the track sections 81 and 82, respectively.

Figure 3:
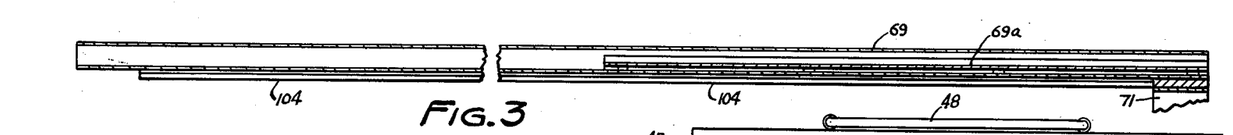
FIGURE 3 is a longitudinal sectional fragmentary view of one of the track elements that are fixed to the base plate; it is drawn to the same scale as FIGURE 2.

In FIGURES 3 and 4, channels 69 and 70 are seen to have tubular chain guide members 69A and 70A attached therein by means of spacers such as the ones 73 in FIGURE 4. Telescoping members 77, 79, 81, 83, 78, 80, 82, and 93 fit in channels 69 and 70 between their outer ends and the ends of chain guides 69A and 70A, respectively. These chain guides are the same size diameter as track members 83 and 93.

Figure 5:
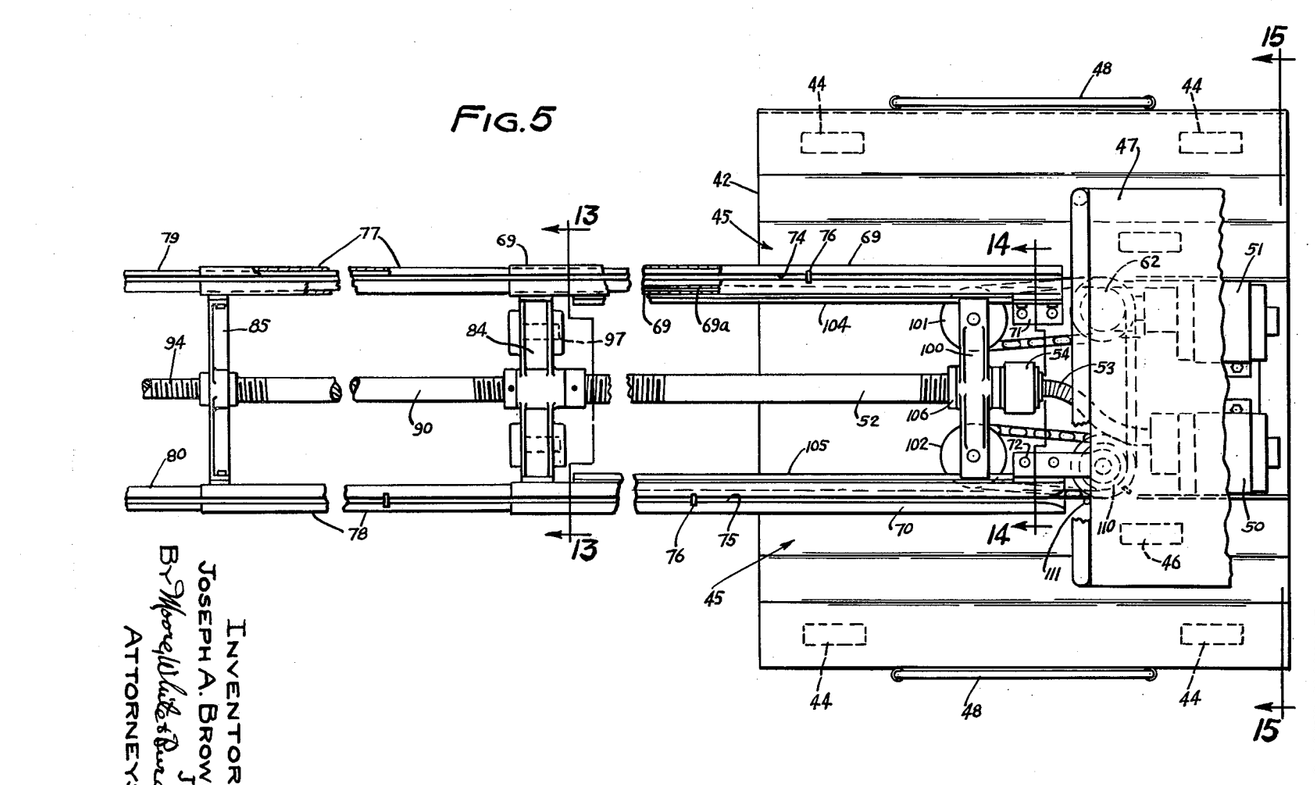
FIGURES 5 and 6 together are a plan view of the device in an extended position; portions of the device are broken away to conserve space; hidden portions are illustrated in broken lines; the scale used is that of FIGURE 2.
Figure 6:
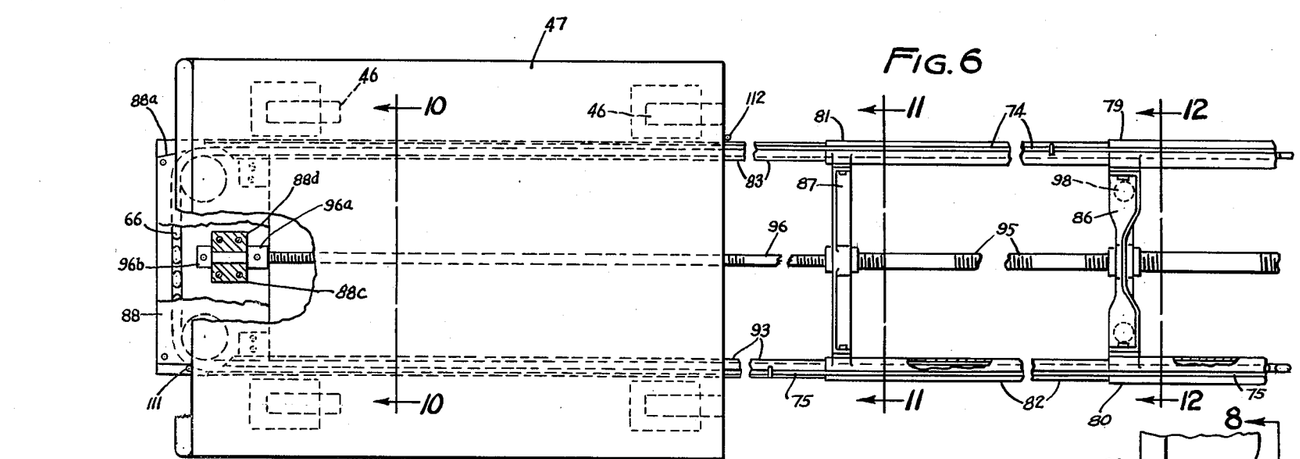
Figure 7:
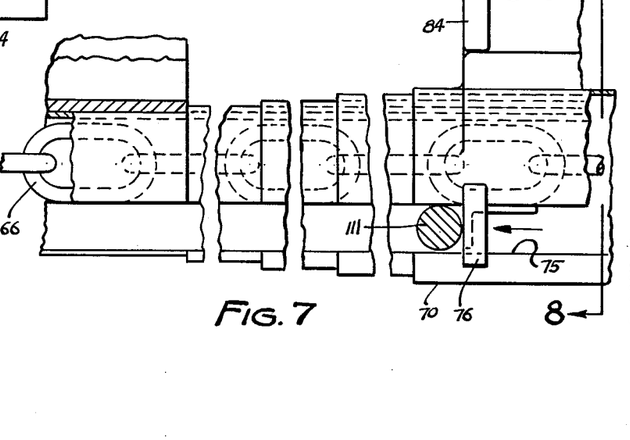
FIGURE 7 is a fragmentary plan view of the extendible track element and endless conveying means together with a cross section of a cargo cart pin being engaged by a lug of the chain; hidden portions are shown with broken lines; the scale used is that of FIGURE 4.
Figure 18:
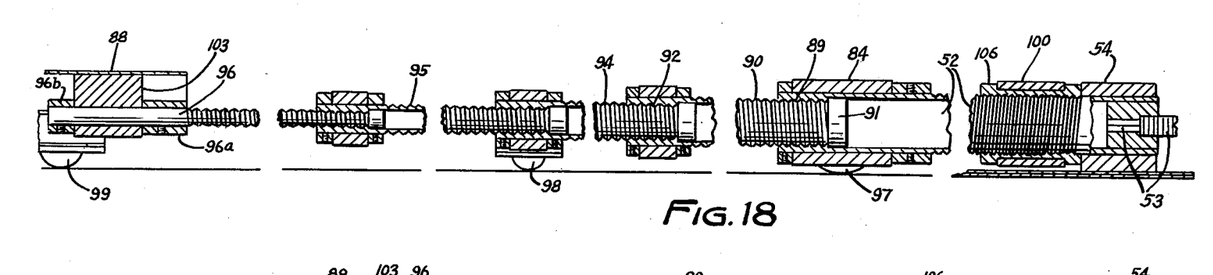
FIGURE 18 is a longitudinal sectional view of the cargo cart conveyor extending means in the extended position as shown in FIGURES 5 and 6; the scale used is that of FIGURE 13.

A means for expanding and contracting the telescopic track sections comprises a plurality of telescoping tubes appearing in FIGURES 2, 5, and 6 but perhaps best illustrated in FIGURES 18 and 19. As the flexible drive 53 transmits power from motor 50 to 52, tube 52 is rotated in a manner to cause the nut portion 89 thereof to rotate about the threads of tube 90. In so doing, the tube is extended as the thread and nut interact. When, however, the head 91 of tube 90 engages the nut portion 89 of tube 52, the head and nut interact to prevent further relative rotation between those two tubes. Tubes 52 and 90, therefore, begin to rotate in unison which produces a similar reaction between the nut portion 92 of tube 90 and the thread of tube 94. The same reaction continues through tube 95 to shaft 96 until the tubes are extended as far as possible. When it is desired to contract the mechanism, a reverse rotation of motor 50 causes a reverse action of the tubes 52, 90, 94, 95, and shaft 96 to withdraw or contract the unit into its collapsed state.

Track sections 69 and 70 and tube 52 are supported by the wheels 97 carried by wheel support 84. Bearing-like casters or rollers 98 which are supported on brace 86 and similar acting bearing units 99 secured to end plate 88 support the balance of the track sections that move forward and backward in response to the telescoping structure.

Plate 88 is a cover plate and support for the chain 66 and pulleys 107 and 108. It has a curved edge at 88A to guide the pin 111 of truck into slot 74. The track elements 83 and 93 are secured to plate 88. A thrust bearing 103 secured to plate 88 rotatably supports the outer end of tube 96 which has collars 96A and 96B attached thereto. Collar 96A pushes the telescoping structure forward when the tubes are moved outward while collar 96B pulls this structure back when the telescoping conveyor is collapsed. The collars allow the tubes to rotate freely until the motor 50 is stopped.

On the outside of tube 52 there are also seen threads as shown clearly in FIGURES 18 and 19. The threads on the outside of tube 52 are considerably finer in pitch than are the threads on the tubes that cause the extension. It will also be noticed that these external threads are in reverse direction to those on the extending contracting tubes. Embracing the outside of tube 52 is the yoke 109 in which are rotatably mounted the sheaves 101 and 102. Yoke 100 also slidably engages the guides 104 and 105 secured to the inside of tracks 69 and 70, respectively. Yoke 100 has a nut portion 106 that engages the reverse finely-cut threads on the outside of 52. As the shaft is rotated as to extend the conveyor from position shown in FIGURE 3 to that of FIGURE 5, nut 106 is moved in the direction of bearing 54 which in turn causes the sheaves 101 and 102 to move toward the power unit end of the conveyor system. Chain 66 is reeved around both of the sheaves 101 and 102 as well as the drive sheaves and the idler sheaves 107 and 108, carried by plate 88, and the idler sheaves 109 and 110 which occupy positions corresponding to sheaves 62 and 65. As sheaves 101 and 102 move away from bearing 54, they remove chain from the active circuit and vice versa. Thus, excess chain is taken up when tube 52 is rotated as to contract the unit and additional effective chain is provided as the unit is extended.

How the take-up system works may perhaps be most easily understood by reference to FIGURE 17 wherein diagrammatically the endless conveyor, chain 66, may be seen to follow a course, commencing with the power sheave 62, first around idler 101 and then back and around idler 65 across to the opposite side of the power unit around the idler 109 out and around the idler 102 back to the power unit again around idler 110. Thence, out around the idlers 108 and 107 on plate 88 and back to the point of the beginning of the power sheave 62. The loop of chain that extends from sheave 62 and 65 around idler 101 and from idlers 109 and 110 out around idler 102 are loops of chain that can be added into or taken from the main circuit around the power sheave 62 and from idlers 107 and 108 to the power unit. Since the endless conveyor take-up is coordinated directly with the extension and contraction of the track system, no skill on the part of the operator is required in order to prevent excess tension or slack developing at any stage of extension and contraction.

In the diagrammatic FIGURE 17 the drive sheave 62 and idler 65 as well as the idlers 109 and 110 are offset slightly in relation to each other in order to make clear the course of the travel of chain around them. As shown in FIGURE 2, however, these sheaves are mounted for rotation about two vertical shafts and are directly above each other in pairs, 62 and 65 being one pair and 109 and 110 being the other.

Figure 15:
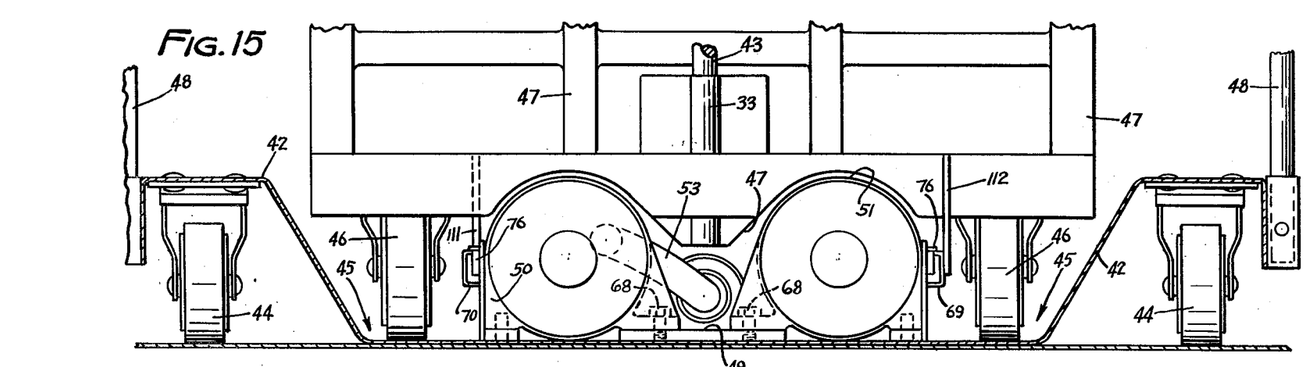
FIGURE 15 is a sectional view taken on the line 15—15 of FIGURE 5 with broken lines illustrating hidden parts; this figure is drawn to the same scale as FIGURE 10.

As shown in FIGURE 15, the cart 47 has pins 111 and 112 secured to it and extending down between the wheels 46 and 47 to engage the lugs 76 on chain 66. As is also shown clearly in FIGURE 15, the pins 111 and 112 are set slightly wider on the cart 47 than the spacing between the channels 74 and 75. Thus, as shown in FIGURE 15 when pin 111 of cart is engaging a lug 76 on chain 66 in track side 70, the pin 112 at the other end of the cart is engaging the outside of track channel 69 to prevent the cart from swinging off center of the track system, as it is being conveyed forward or to the front edge of plate 88 by the engagement of said pin 111 and a lug 76 of chain 66.

When it is desired to move the cart in the opposite direction on the conveyor, pin 111 is guided by an operator onto the conveyor with the help of portion 88A of plate 88 so as to engage in the slot 74 of the track section 69, 77, 79, 81, and 83 whereby lugs moving in the opposite direction engage pin 111. Again the opposing pin 112 engages only the exterior of the track elements 70, 78, 80, 82, and 93. Thus, when the chain is driven, carts may be moved up and down on the conveyor in either direction.

Figures 22, 26:
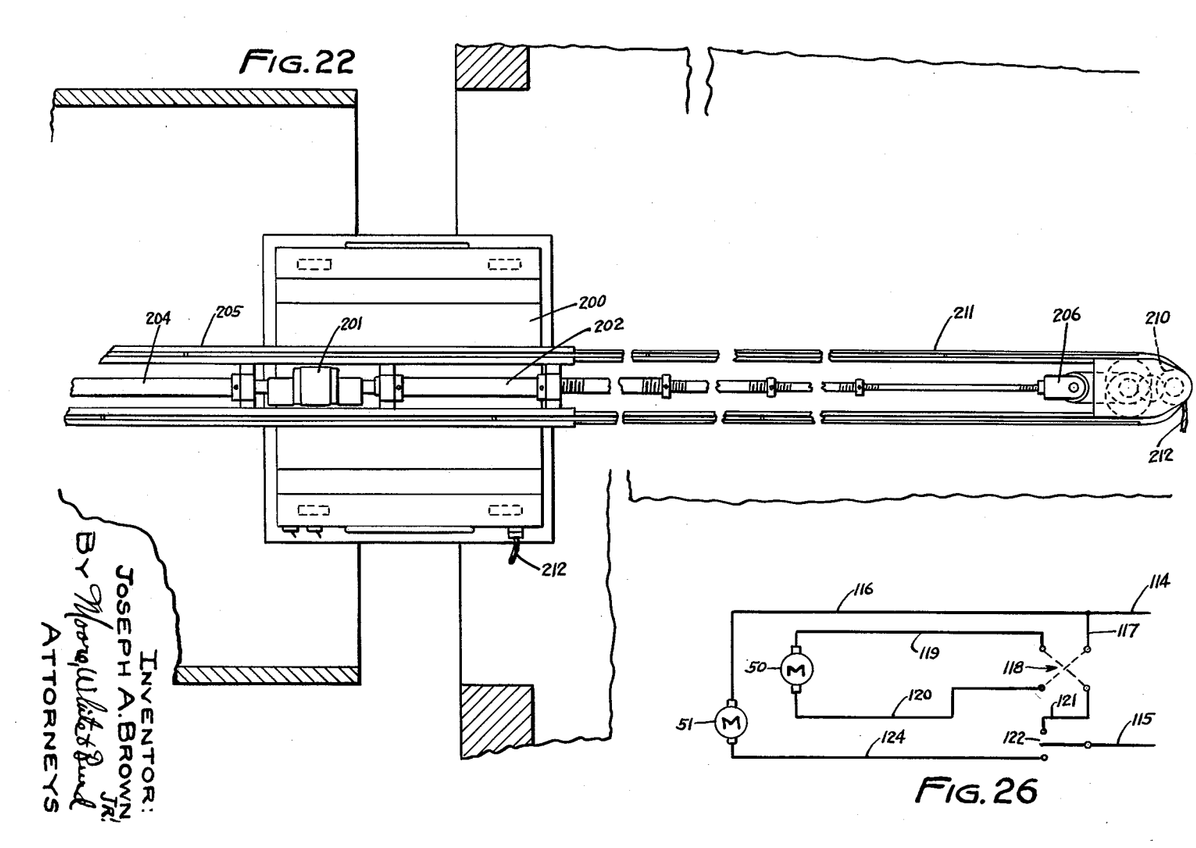
FIGURES 22 and 23 together show a fragment of a warehouse and vehicle being served by a modified form of the cargo cart conveyor in plan view; broken lines show hidden parts and represent a cargo cart being moved by the loader; the scale used is smaller than that of FIGURE 2.
FIGURE 26 is a schemmatic wiring diagram for the power unit of either of the conveyor devices.
Figure 23:
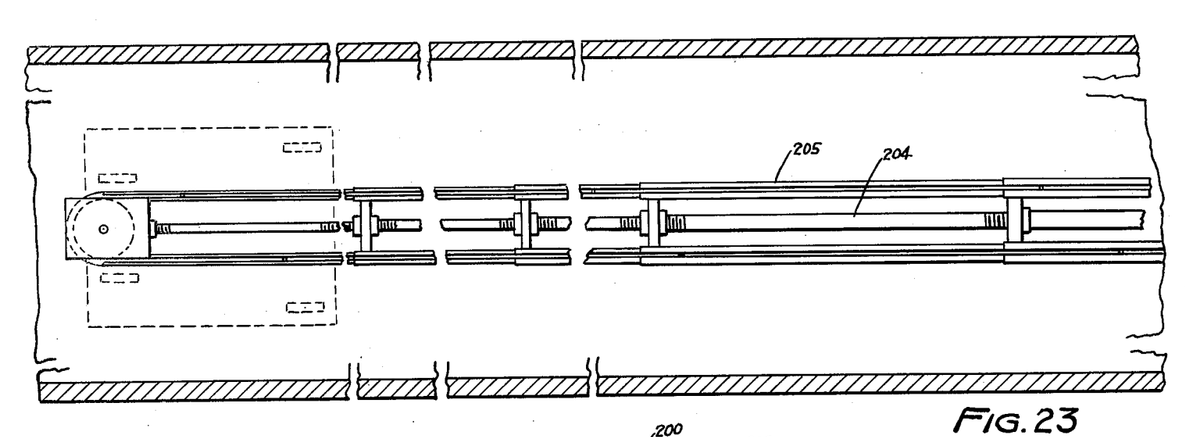
Figure 24:
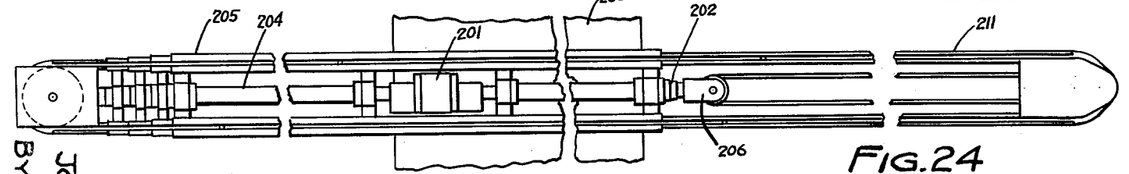
FIGURE 24 shows the conveyor form of FIGURES 22 and 23 in retracted position; it is drawn to the same scale as FIGURE 22.

FIGURE 26 shows a preferred form of the wiring arrangement for the unloader wherein two power leads 114 and 115 are provided to connect the device to a suitable source of power (not shown). The lead 114 may be seen as connecting directly to the motor 51 via lead 116. Through jumper 117 the power lead 114 is connected also to one terminal of the reverse switch 118. The reversing switch is connected by means of a lead 119 to the motor 50. A second lead 120 is the other side of the motor 50 circuit to the reversing switch 118. A jumper lead 121 connects the remaining terminal of the reversing switch to the control switch 122. Control switch 122 which is a single pole, double throw switch is connected by means of lead 124 from another terminal post thereof to the motor 51. A center terminal of switch 122 is connected to power lead 115. This circuit provides the following control for the unloader.

Moving the switch 122 as to contact lead 124 will cause the conveyor to operate regardless of the extension or contraction of the cargo cart conveyor. When switch 122 is manipulated to provide power from 115 to jumper lead 121, motor 50 will operate in whatever direction the reversing switch 118 is set to provide. Thus, switch 118 is placed in the desired position to cause extension or contraction and the amount thereof is controlled by manipulating switch 122.

In the modified form of the conveyor shown in FIGURES 22 through 25 a structure similar to that previously described is shown except that it is provided with a different form of conveyor take-up. A central power unit is designated 200 and carries thereon a drive motor 201 for extending and contracting the loader and also for operating the conveyor take-up mechanism. This motor 201 through appropriate gear reduction drives the tube groups designated 202 and 204, respectively, on opposite sides thereof.

Figure 25:
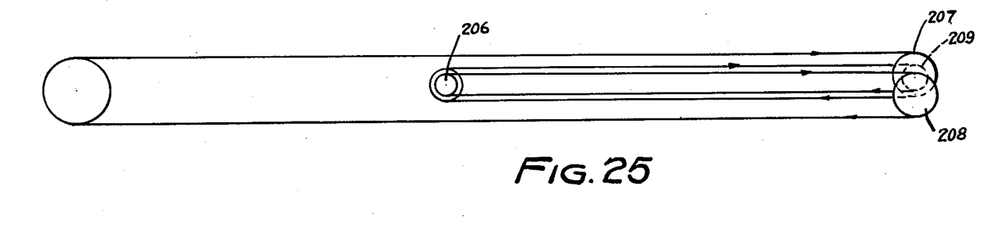
FIGURE 25 is a diagrammatic representation showing the course of travel of the endless element in modified form of the device illustrated in FIGURES 22 through 24.

These two telescoping tube sections operate in the same manner as the tube sections described in detail for the preferred form. The telescopic tubes 204 serve to extend and contract the collapsible end 205 of the modified form of the conveyor while the tubes 202 carry at their outer end a sheave means 206 which serves as a conveyor take-up in the same manner that the yoke structure does in the preferred form of the device. Sheave 206 is actually a double sheave but of the equal diameter and aligned one above the other and, therefore, appearing to be single in FIGURE 22. By reference to the diagrammatic showing of the cable carrying structure in the modified form of the invention, however, sheave 206 has one portion shown smaller to make clear that it is a double sheave. Two loops of excess chain are reeved around it and therefrom over to the drive and idler sheaves 207 and 208, respectively. The drive sheave carries a small idler 209 on a lower shaft portion. The loops that engage the double sheave 206 and the sheave group 207–209 are operatively the same as the excess chain loops engaging the sheaves 101, 102 in the preferred form of the construction. As the motor 201 rotates to drive structure 204 to an extended position in order to extend the conveyor, tube 202 is being extended also in order to allow sheave 206 to be near the sheave group 207–209. Thus, substantially all the chain is involved in the conveyor circuit when groups 202 and 204 are extended. As the conveyor is contracted, however, the sheave 206 is carried back near the power unit 200, thereby making of maximum size the excess chain loops between the sheave 206 and the group 207–209. Modified form of the device has a drive mechanism 210 near the end of the track section 211. It is provided with power in any suitable manner as by the cord 212 or the like, fragments of which may be seen both at the outer end of track section 211 and also extending from the power 200. In practice this cord will be secured to the under side of track section 211 as to be out of the way of moving parts. The modified form of the device carries the same type of lug structure in its track element, and is used with carts provided with pins also, just as is the preferred form of the invention. The two units are used in the same manner which use will now be described.

The unit positioned at 38, FIGURE 1, is manipulated until it occupies a position inside of the truck semitrailer body such as the one designated 35 in FIGURE 1. This is done by maneuvering the conveyor, using the hand rails 48, and guiding it across the dock plate 37 into the semitrailer body. Reversing switch 18 is then placed in a position to cause extension of the conveyor and control switch 122 is moved to operate motor 50. The conveyor is soon extended to its full length, as shown in the upper representation of FIGURE 1. Wheeled cargo carts such as those 41A, 41B, and 41C are taken off conveyor 40 by hand and moved across to engage the conveyor unit. Switch 122 is then placed in the position to cause the chain 66 to begin its circuitous path around the various sheaves out to the end of the extendible conveyor. The cart is manipulated so that the pin 111 engages the slot 75 in track 70. A lug 76 on chain 66 will then engage pin 111 and begin conveying the cart forward along the conveyor unit. At this stage the operator must exercise care to make sure that pin 112 does not enter the slot 74.

In FIGURE 1 the trailer body 35 is shown partially loaded with cargo 125 at its forward end. As soon as a wheeled cargo cart such as the one designated at position 126 reaches the outer end of the conveyor, it is manually pulled free and the cargo thereon placed adjacent that designated 125. In the meantime a second cart is manipulated across dock plate 37 and engaged to the conveyor belt. By the time the operator at the forward end of the semitrailer body has unloaded the first cart, as shown at position 126, a second cart will be nearly out to him. The operator immediately pulls the second cart free of the conveyor and engages the empty cart with the conveyor track slot 74. Again lugs 76 engage the pins of the cart and convey it along the track. This time, however, the empty cart is moving from the outer end of the conveyor toward the power unit 30. While the empty cart is coming down the conveyor, the operator at the inner end of the conveyor is unloading another cart so it will be ready to be conveyed out. As soon as the empty cart is far enough out to permit the power unit operator to reach it conveniently, he pulls it free from the conveyor and guides a loaded truck onto the conveyor for its trip into the semitrailer body to the personnel who are loading the trailer from the carts being conveyed to them. As shown in the lower representation in FIGURE 1, the conveyor is contracted to accommodate its length in terms of the extent to which the semitrailer is filled with merchandise, as to leave space for the operators to work. In unloading a carrier van body, the process of shortening is continued until it is no longer economical to use the conveyor. It is then pulled free from the dock plate and parked as shown in 38 in FIGURE 1. Alternately the conveyor may be moved to a different trailer body to either aid in loading or unloading it. The last few carts loading the very rear end of the semitrailer are pushed in by hand in the usual manner. Since the distance involved is slight, however, little time is lost in pushing the carts back and forth.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A mobile cargo conveyor comprising a power base, an extensible member secured to said power base, an endless conveyor means movably secured to said extensible member, an endless conveyor means take-up structure linked to said extensible member for simultaneous operation therewith; whereby said endless conveyor means may be kept free of slack automatically throughout the extension and contraction of said extensible member, said extensible member being axially movable by a screw thread, and said endless conveyor take-up means being operable by a screw thread having an opposite pitch to that of the extensible member screw thread.

2. The cargo conveyor of claim 1 in which said endless conveyor means comprises a chain reeved around sheaves and at the sides of said extensible member passing through track channels, lugs secured to said chain at spaced intervals, and carts for use with said conveyor comprising a wheeled frame, pins depending from the wheeled frame and adapted to extend into one of said channels of said conveyor; said pins being spaced farther apart than the channels through which said chain passes.

3. The cargo conveyor of claim 1 in which the extensible member is a telescopic screw thread structure, and said endless conveyor take-up means is an oppositely extending telescopic screw thread structure.

4. The cargo conveyor of claim 1 in which the extensible member is a telescopic screw thread structure, said endless conveyor take-up means in an oppositely extending telescopic screw thread structure and a single power unit drives both of said screw thread structures from opposite ends of said power unit.

5. A cargo conveyor comprising a power unit, an extensible member secured to said power unit, an endless conveyor secured to said extensible member, means for maintaining said endless conveyor free from slack throughout the range of the extension and contraction of said extensible member, and a cart having means cooperating with means on said endless conveyor for selective propulsion of said cart along said extensible member.

6. A cargo conveyor having a power unit comprising a truck assembly having outer raised edges, wheels under said outer raised edges, channels inside said wheels, a center portion on which are mounted at least two power units, fixed tracks secured at both inside portions of said channel, track means telescopically associated with said fixed track, telescoping threaded means between said telescoping track means, means securing the ends of said telescopic track means to said telescopic threaded means, the largest of said telescopic thread means having external reverse threads, a yoke threadably engaging the reverse threads, a pair of idler sheaves rotatably supported on said yoke, idler sheaves positioned at the ends of said extensible and fixed track means, a power sheave secured to one of said power units to be rotated unidirectionally thereby, an endless conveyor means engaging said idler and powered sheaves, lugs secured to said endless conveyor and extending in said track means, and a reversible power unit secured to said threaded telescopic means.

7. The cargo conveyor of claim 6 in which the external reverse thread means on the largest of said telescopic thread means is of a finer pitch than the threads of the telescopic means engaging each other.

8. The cargo conveyor of claim 7 in combination with a cooperating cart comprising, a wheeled cart frame, pins secured to said wheeled cart frame and adapted to engage the lugs secured to said endless conveyor in one of said track means selectively; the pins on said cart being spaced farther apart than said tracks.

9. The combination of a cargo conveyor as set forth in claim 5 in combination with a cooperating cart comprising, a wheeled cart frame, pins secured to said wheeled cart frame and adapted to engage the lugs secured to said endless conveyor in one of said track means selectively; the pins on said cart being spaced farther apart than said tracks.

10. A cargo conveyor comprising a power unit, fixed track means secured to said power unit, telescopic track means slidably arranged within said fixed track means and each other, means for extending and contracting said telescopic track means relative to said fixed track means and each other, sheaves rotatably secured to the outer end of the innermost telescopic track means to retain a fixed location relative thereto, sheaves rotatably secured to the inner end of said fixed track means, variable-position sheaves between said track means, an endless chain reeved around all of said sheaves as to provide a pair of loops over said variable-position sheaves, and means for moving said movable sheaves as said telescopic track means are extended and contracted; whereby loops of endless chain are inserted into and removed from the effective circuit of said endless chain means, and means secured to said endless chain means for engaging cargo carrying carts to convey them along said fixed and telescopic track means at will.

11. The cargo conveying device of claim 10 in which said means secured to said chains comprises lugs and cooperating pins secured to cargo carrying carts used with said conveyor.

12. The cargo conveying device of claim 10 in combination with cargo carrying carts comprising frames adapted to be moved over a surface, pins depending from said carts and adapted to engage said means secured to said endless chain, the pins on said carts being spaced farther apart than said telescopic track means; whereby a pin will engage a lug on only one side of said telescopic track means at a given time.

References Cited in the file of this patent

UNITED STATES PATENTS

| 1,000,106 | Morris | Aug. 8, 1911 |
| 2,491,255 | Edwards | Dec. 13, 1949 |

FOREIGN PATENTS

| 942,867 | Germany | May 9, 1956 |